United States Patent
Okada

(10) Patent No.: US 6,711,626 B1
(45) Date of Patent: Mar. 23, 2004

(54) COMPOSITE DEVICE, COMPOSITE DEVICE SYSTEM, METHOD OF CONTROLLING COMPOSITE DEVICE, AND MEDIUM ON WHICH PROGRAM FOR CONTROLLING COMPOSITE DEVICE IS RECORDED

(75) Inventor: Takahiro Okada, Hokkaido (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/673,030
(22) PCT Filed: Feb. 9, 2000
(86) PCT No.: PCT/JP00/00722
§ 371 (c)(1),
(2), (4) Date: Oct. 10, 2000

(30) Foreign Application Priority Data

Feb. 10, 1999 (JP) .............................................. 11-32210

(51) Int. Cl.$^7$ .............................................. G06F 13/00
(52) U.S. Cl. ................... 710/5; 710/40; 710/36
(58) Field of Search ........................... 710/62, 64, 100, 710/305, 5, 6, 40, 36; 358/1.14, 1.15

(56) References Cited

U.S. PATENT DOCUMENTS

| | | | | |
|---|---|---|---|---|
| 4,947,345 A | * | 8/1990 | Paradise et al. ............ | 358/442 |
| 5,206,735 A | * | 4/1993 | Gauronski et al. .......... | 358/296 |
| 5,299,296 A | * | 3/1994 | Padalino et al. ........... | 358/1.13 |
| 6,279,049 B1 | * | 8/2001 | Kang .......................... | 710/15 |
| 6,298,405 B1 | * | 10/2001 | Ito et al. ..................... | 710/107 |
| 6,421,135 B1 | * | 7/2002 | Fresk et al. ................. | 358/1.15 |

FOREIGN PATENT DOCUMENTS

JP    10-283308    10/1998    ........... G06F/13/36

\* cited by examiner

Primary Examiner—Kim Huynh
(74) Attorney, Agent, or Firm—Sughrue Mion, PLLC

(57) ABSTRACT

There is no means for carrying out exclusion between devices when a plurality of functions are given to a single peripheral device, for example, when a composite device is realized by incorporating, into a peripheral device having only one USB terminal, a printer and a scanner both of which use a common printing mechanism, as devices. A USB port 10a having a physically single connector connecting section and connectable to a single composite device at one connector is logically divided to be constituted into a plurality of logical channels. A scanner 20, printer 40 and a controller 30 controlling them are connectable to the respective logical channels as devices. Thus, devices having a plurality of functions respectively can be provided in the single composite device.

8 Claims, 11 Drawing Sheets

COMPOSITE DEVICE, COMPOSITE DEVICE SYSTEM, METHOD OF CONTROLLING COMPOSITE DEVICE, AND MEDIUM ON WHICH PROGRAM FOR CONTROLLING COMPOSITE DEVICE IS RECORDED

BACKGROUND OF THE INVENTION

1. Field of the Invention

This invention relates to a composite device, composite device system, method of controlling a composite device, and medium on which a program for controlling a composite device is recorded, and more particularly to such a composite device which comprises at least two devices and in which at least one of the devices controls the other, such a composite device system, such a method of controlling a composite device, and such a medium on which a program for controlling a composite device is recorded.

2. Description of the Prior Art

There has recently been a trend of standardizing connection of a computer with various peripheral devices such as printers, scanners, facsimile machines and digital cameras by the interface of the same connector and cable. This interface has been actualized by the universal serial bus (USB). The USB has specifications that a single computer can be connected to up to 127 peripheral devices. When a hub to which a USB device is connectable is provided, a plurality of peripheral devices can be connected through the hub.

When a plurality of functions are given to a single peripheral device, for example, when a composite device is realized by incorporating, into a peripheral device having only one connector connecting section for USB, a printer and a scanner both of which use a common printing mechanism, as devices, there is no means for carrying out exclusion between the devices. Accordingly, the devices need to be controlled individually in order that exclusion may be carried out for a common section such as the printing mechanism. More specifically, a user of the aforesaid composite device needs to use a predetermined one device while taking the other device into consideration. More concretely, when desiring to use the printer, the user needs to use it after having confirmed that the scanner is not used. In the same way, when desiring to use the scanner, the user needs to use it after having confirmed that the printer is not used. Furthermore, the composite device needs to be provided with means for displaying that individual devices have been incorporated therein. Thus, the same result is achieved as that in the case where a plurality of devices are merely connected together and accordingly, the advantages of the composite device cannot be obtained.

SUMMARY OF THE INVENTION

The present invention was made in view of the foregoing and an object of the invention is to provide a composite device which comprises at least two devices and in which at least one of the devices controls the other, so that the composite device can easily be operated since the user is conscious of only the device to be controlled without taking the other device into consideration, and in which competition between the devices can be eliminated, such a composite device system, such a method of controlling a composite device, and such a medium on which a program for controlling a composite device is recorded.

To achieve the object, the invention in one embodiment provides a composite device comprising an interface unit divided into at least two logical channels which are physically identical and obtaining a predetermined command, and at least two devices interconnected to the logical channels of the interface unit respectively and operated on the basis of the predetermined command, wherein at least one of the devices is a control device controlling an operation of the other device.

In the embodiment of the invention constructed as described above, the composite device includes two devices accomplish two predetermined functions respectively. One of the devices is a control device, and an operation accomplishing the function of the other device is controlled by the control device. The control of the operation of the other device by the control device includes, for example, a case where when the other device comprises a scanner, it is started, the scanning is performed, a predetermined setting is performed for the scanner, or status information delivered by the scanner is monitored. Furthermore, these at least two devices are physically identical, and the devices and the logical channels are connected by the interface unit divided into at least two logical channels respectively. More specifically, the device is connected to one of logically divided logical channels whereas the control device is connected to the other. The operation of the other device is controlled by the control device.

To be physically identical means that types of connectors and cables used for connection are the same and are connected to a single external device. A plurality of devices can be connected to the physically identical external device by a plurality of logical channels. The interface unit has the physically identical arrangement as described above and is connected to one external device. The interface unit is further divided into at least two logic channels for each of which a device is connected. Each device inputs a predetermined command from the external device to carry out a predetermined operation. The control device inputs a command for operating itself from the external device and a command for operating the other device. When inputting the command for operating itself, the control device carries out the predetermined operation. In the case of the command for the other device, the control device controls the operation of the device corresponding to the command. The single external device connected to the interface unit may be a computer which is connected to the composite device or a hub.

When the hub is connected as the external device, a plurality of external devices such as a computer are connectable. Accordingly, the command the interface unit inputs is a command delivered from the computer connected as described above or a command delivered from a plurality of computers connected via the hub or from an external device with a same host function as a computer.

As the device other than the control device, a device for obtaining image data or a device performing printing on the basis of image data is exemplified. In this case, the device for obtaining the image data may obtain the image data by a predetermined technique. For example, it may be a scanner. Of course, the device should not be limited to the scanner. It may be an image data file to be scanned by the scanner or image input from a digital camera or digital video.

The device carrying out the printing may be one which can print image data with a predetermined format or print data on a recording medium. Accordingly, the device may be a page printer or dot impact printer. Of course, it should not be limited to them and may be an ink jet printer.

On the other hand, two or more devices may be provided when the interface unit has two or more logical channels.

For example, a plurality of devices such as a scanner, printer, digital camera or facsimile machine may be connected to the logical channels respectively.

The control device may control the operation of the other device by a predetermined hardware arrangement or processing on software. Of course, both of hardware and software may be used for the operation control.

A plurality of logical channels need to be set in the interface unit and external devices need to be connected to the respective logical channels and to be operated. Accordingly, the interface may be realized by USB or small computer system interface, SCSI. Of course, the interface unit need not be limited to these arrangements.

The control device controls the operation of the other device. In this case, the command for carrying out the operation and annexed data needs to be transferred to the other device. The command and data can be transferred via the logical channel between the devices. Even so, it is not advantageous on the processing for the interface unit performing data transfer from and to the outside to also perform data transfer in the composite device. In view of this problem, a further embodiment of the invention is constructed so that in the composite device, the control device secures a data transfer path to the other device and controls data transfer from said other device.

In the embodiment of the invention constructed as described above, the data transfer path is connected to both the control device and the other device. Accordingly, data can be transferred between the devices via the data transfer path. The control device carries out the data transfer.

When the command the control device inputs via the logical channel of the interface unit is used to operate the other device, the command is transferred via the data transfer path to the corresponding device together with data accompanying the command, so that the device is operated. Furthermore, data produced as the result of the operation of the device is input via the data transfer path. Furthermore, when the other device is provided and data transmission and date transfer is performed between the devices, the control device controls the data transfer between the devices.

Furthermore, another embodiment of the invention is constructed so that in the composite device, the device other than the control device includes at least a data input device and a data output device, and the control device controls data transfer between the data input and output devices.

In the embodiment of the invention constructed as described above, the device other than the control device comprises at least the data input device and data output device. The control device controls data transfer via the data transfer path between the data input and output devices. More specifically, data input by the data input device can directly be transferred to the output device via the data transfer path.

Furthermore, in yet another embodiment, the invention is constructed so that in the composite device, the control device includes a user interface unit directly receiving instructions from a user as well as said interface unit.

In the embodiment of the invention constructed as described above, the control device includes the user interface unit and receives instructions from the user via the user interface unit, controlling the other device on the basis of the instructions. More specifically, the control device can directly receive instructions about the operation of the device from the user as well as the interface unit.

When the control device inputs via the interface unit a plurality of commands operating one and the same device, namely, when a conflict occurs between commands, it is desirable that the control device can perform an exclusion control so that one of the commands operates the device. Furthermore, an external device needs to re-deliver the command when the command is cancelled as the result of the exclusion control. This is troublesome in the processing. In view of this problem, in another embodiment, the invention is constructed so that in the composite device, the control device inputs a predetermined command the interface unit has obtained and includes a command holding unit operating the device on the basis of one command while holding the other command, when a conflict occurs in the device to be operated on the basis of the predetermined command, the control device operating the device on the basis of the command held by the command holding unit upon completion of the operation on the basis of said one command.

In the embodiment of the invention constructed as described above, a conflict of operation occurs in the device when the control device inputs from the interface unit a plurality of commands operating one and the same device. The control device controls the device so that it is operated on the basis of a predetermined one of the commands in a conflict. In this case, the command holding unit sequentially holds the command which is not executed as the result of control. Upon completion of the operation on the basis of the predetermined command, the device is controlled so as to be operated on the basis of the command held by the command holding unit.

When a conflict occurs between operations of the device, the operation on the basis of the command held by the command holding unit is on standby. In this case, a cause for inexecution of the command is unknown at the side of an external device to which the command is delivered. This results in inconvenience. In view of this problem, one embodiment of the invention is constructed so that in the composite device, the control device includes an operation standby notifying unit notifying operation standby to the device to which the command held by the command holding unit is delivered.

In the embodiment of the invention constructed as described above, the operation standby notifying unit notifies operation standby to the device to which the command held by the command holding unit is delivered. Commands the composite device inputs at the interface unit include those which are used to operate the device and those which are used to obtain the status of the device. Accordingly, when a command is used to obtain the status of the device, the control device obtains a predetermined status of the device and notifies it to the device to which the command is delivered.

Accordingly, in another embodiment, the invention is constructed so that in the composite device, the control device includes a status notifying unit obtaining, from the device, a status indicative of a working condition of the device, when the command obtained by the interface unit is a command for obtaining a status.

In the embodiment of the invention constructed as described above, the control device obtains a status indicative of a working condition from the device via the data transfer path when a command obtained by the interface unit is used to obtain a status of the device. The control device further notifies the status via the logical channel to an external device to which the command is delivered.

In one embodiment using the composite device, a predetermined device is operated on the basis of a command obtained by the interface unit and data attendant on the command, so that a desired output is achieved. Even so, the same importance is not put on all of a plurality of commands. They include important commands or commands having priority over others and less important commands or commands having no priority over others. When a command having a higher importance and operating a device is obtained while the same device is being operated on the basis of another command having a lower importance, it is desirable that the command in execution is interrupted and the obtained command having the higher importance is executed.

Accordingly, in another embodiment, the invention is constructed so that in the composite device, the control device includes a priority setting unit setting a priority for commands obtained by the interface unit, and when inputting a command operating a predetermined device and having a higher priority while operating the predetermined device on the basis of another command having a lower priority, the control device interrupts operation of the device on the basis of the command having the lower priority and operates the device on the basis of the command having the higher priority.

In the embodiment of the invention constructed as described above, the control device includes a priority setting unit setting a priority for commands obtained by the interface unit. When inputting a command operating a predetermined device and having a higher priority while operating the predetermined device on the basis of another command having a lower priority, the control device interrupts operation of the device on the basis of the command having the lower priority and operates the device on the basis of the command having the higher priority.

When the command having the higher priority is accepted and execution of the command having the lower priority is interrupted, the command needs to be re-input regarding the interrupted one. This could cause problems. In view of this problem, one embodiment of the invention is constructed so that in the composite, the control device holds in the command holding unit the command regarding which the operation of the device is interrupted and operates the device on the basis of the command regarding which the operation of the device is interrupted, said command being held by the command holding unit, when the operation of the device on the basis of the command having the higher priority.

In the embodiment of the invention constructed as described above, the control device holds the interrupted command at the command holding unit and operates the device on the basis of the interrupted command upon completion of execution of the command having the higher priority.

The aforesaid composite device may exist as a single substance or may be a composite device system composed by connecting the composite device to a host delivering predetermined commands and data attendant on the commands to the interface unit. Accordingly, another embodiment of the invention provides a composite device system including a host delivering a predetermined command and a composite device connected to the host, including a plurality of devices, and inputting the command delivered by the host to thereby operate a predetermined device on the basis of the command, the composite device comprising an interface unit divided into at least two logical channels which are physically identical and obtaining a predetermined command, and at least two devices interconnected to the logical channels of the interface unit respectively and operated on the basis of the predetermined command, wherein at least one of the devices is a control device controlling an operation of the other device, and wherein the host includes a command output unit delivering a predetermined command.

In the embodiment of the invention constructed as described above, the composite device system includes a host generating and outwardly transferring a command and data attendant on the command, and a composite device inputting the command and data attendant on the command and operating a device corresponding to the command. The host and the composite device may be connected together in the relation of one-to-one or a plurality of hosts and a plurality of composite devices may be connected optionally. The composite device obtains at the interface unit a predetermined command. When inputting the command obtained by the interface unit, the control device controls the other device on the basis of the command. On the other hand, the host generates in the command output unit a predetermined command. The command is delivered to the interface unit of the composite device connected to the host.

A technique for controlling at least two devices connected to at least two logical channels respectively should not be limited to a substantial device and it can easily be understood that the technique may function as a method. Accordingly, in yet another embodiment, the invention provides a method of controlling a composite device controlling at least two devices connected to at least two logical channels respectively, comprising an interface step of obtaining predetermined commands from at least two logical channels which are physically identical, and a device operating step of operating said at least devices connected to said at least two logical channels respectively, on the basis of the predetermined commands, wherein an operation of at least one device is controlled by the other device.

Thus, the technique should not be limited to the substantial device and must be effective as a method. By the way, the composite device controlling at least two devices connected to at least two logical channels respectively sometimes exists independently or are sometimes used as incorporated in another device. Thus, the scope of the invention covers various forms of implementation. Accordingly, the invention may be implemented as software or hardware.

When the present invention is implemented as software for a copier performing copying and printing on the basis of obtained predetermined print data while storing image data obtained by a predetermined technique, the invention exists as a recording medium on which the software is recorded. As one example, in a further embodiment, the invention provides a medium on which a composite device control program for controlling at least two devices connected to at least two logical channels respectively, the program performing an interface step of obtaining predetermined commands from at least two logical channels which are physically identical, and a device operating step of operating said at least devices connected to said at least two logical channels respectively, on the basis of the predetermined commands, wherein an operation of at least one device is controlled by the other device.

The recording medium may be a magnetic one or a photomagnetic one, or any recording medium that will be developed in the future. Furthermore, the invention may take such a replicated form as a primary replicated product, secondary replicated product, etc. In addition, the invention may be supplied through use of a communication line.

Furthermore, there may be provided such an arrangement that some parts of the present invention are embodied in software while the other parts thereof are embodied in hardware. In a modified embodiment of the invention, some parts thereof may be formed as software recorded on a storage medium to be read into hardware as required.

DETAILED DESCRIPTION OF THE PREFERRED EMBODIMENT

Figure 1:
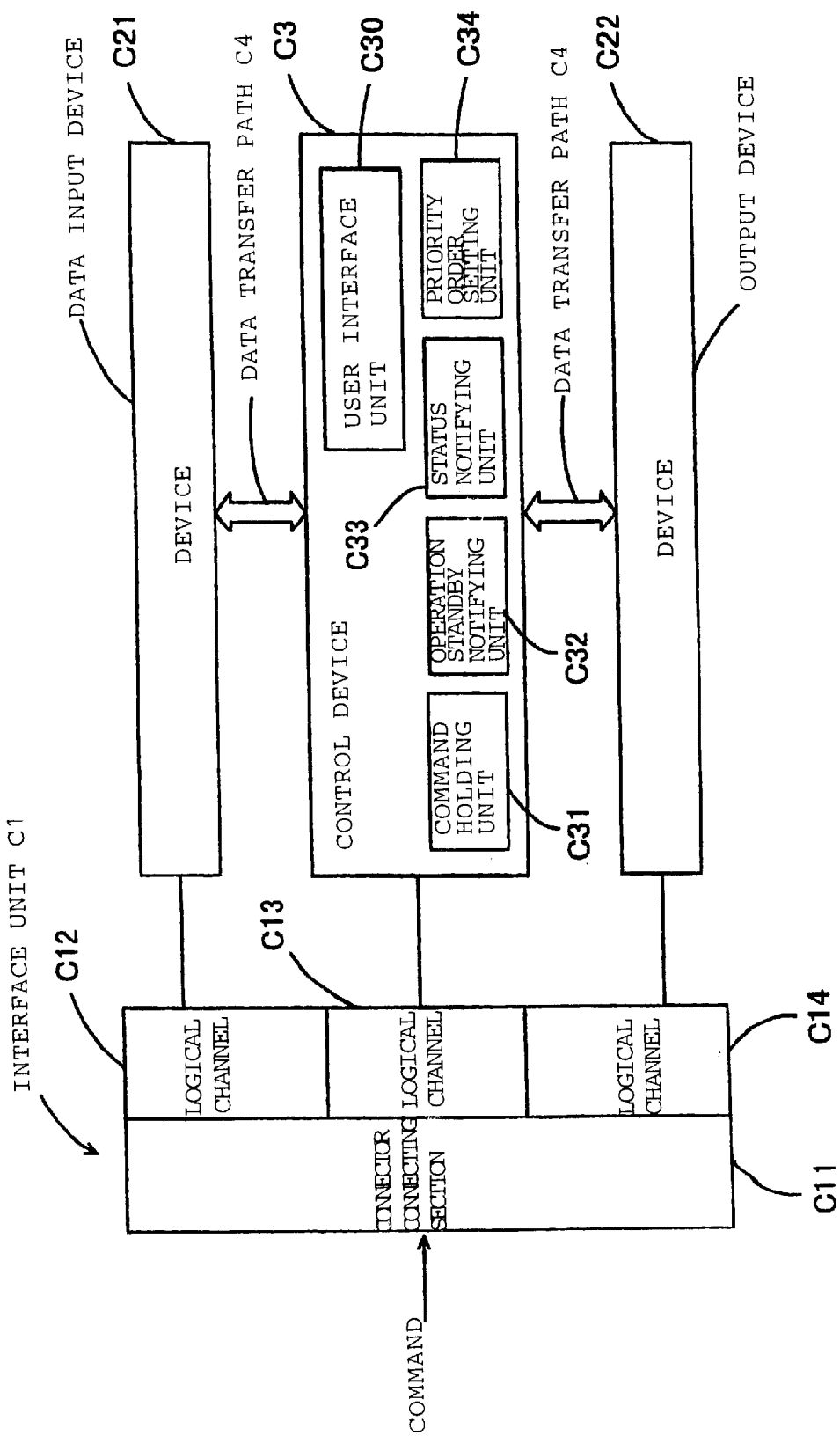
FIG. 1 illustrates a composite device of one embodiment in accordance with the present invention.

One embodiment of the present invention will be described with reference to the accompanying drawings. FIG. 1 illustrates a composite device of the embodiment in accordance with the present invention. In the figure, an interface unit C1 includes a physically single connector connecting section C11 and three logical channels C12, C13 and C14 classifying a command input via the connector connecting section C11. Two devices C21 and C22 are connected to the logical channels C12 and C14 respectively. A control device C3 is connected to the logical channel C13. The devices C21 and C22 and the control device C3 input a command delivered via a specified one of the logical channels C12, C13 and C14 from a predetermined external device connected to the connector connecting section C1. Furthermore, a user interface unit C35 is provided in the control device C3. When inputting a command from the user interface unit C30, the control device C3 operates according to the command. A plurality of commands can be input at once from the interface unit C1 and the user interface unit C30. A plurality of commands operating one and the same device is sometimes input when occasion demands. Of course, since each of the devices C21 and C22 can execute only the operation corresponding to one command, some meditation is required for the commands in conflict. For this purpose, the control device C3 includes a command holding unit C31 holding a command in conflict. An operation executed on the basis of the held command is caused to be on standby and the devices C21 and C22 can be operated according to the held command every time when the operation on the basis of the other command has been completed. Furthermore, the control device C3 includes an operation standby notifying unit C32 and a status notifying unit C33. The control device C3 notifies the status of a command held upon occurrence of conflict to an external device from which the command has been delivered. As a result, conditions where the command is held and the operation is on standby and status of the devices C21 and C22 under these conditions can be notified to a user of the external device. On the other hand, a priority order setting unit C34 provided in the control device C3 is used when a priority order is desired to be set for commands which are to be on standby. When a priority order of the commands is set by the priority order setting unit C34, standby and holding of the commands in conflict are carried out according to the priority order.

There is a case where data transfer needs to be performed between the devices C21 and C22. In this case, the control device C3 controls the data transfer. However, the data transfer should not be carried out via the logical channel C13 between the logical channels C12 and C14 to which the devices C21 and C22 are connected respectively. According to data transfer paths C4 are provided between the control device C3 and the respective devices C21 and C22. The data transfer paths C4 are used for data transfer between the control device C3 and the respective devices C21 and C22. The data transfer is carried out under the control of the control device C3, whereupon a speed at which a large amount of data is transferred can be increased. When such a large amount of data can be transferred at a high speed, the devices C21 and C22 are suitably arranged to serve as data input and output devices respectively.

Figure 2:
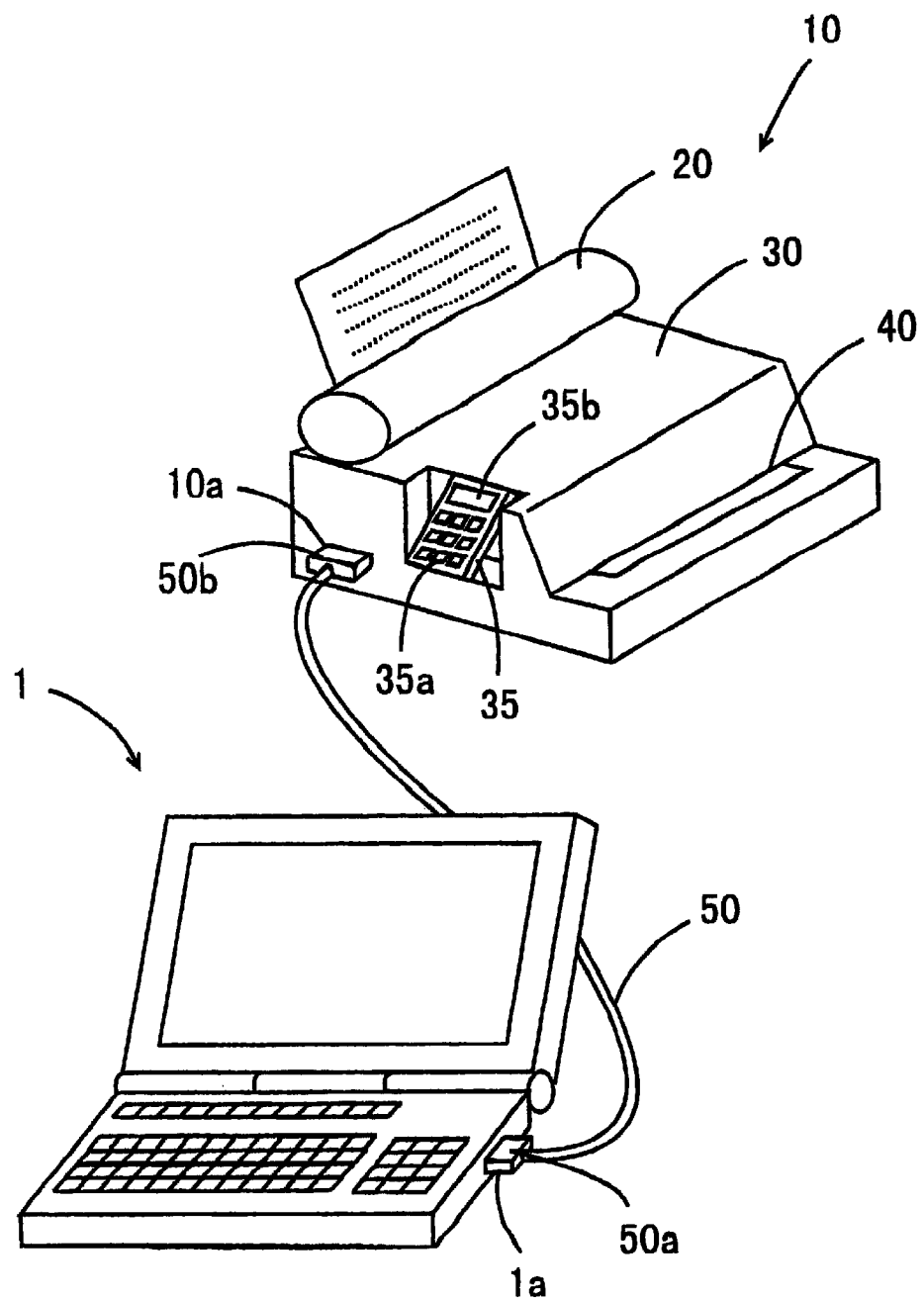
FIG. 2 illustrates a composite device system in which a copier to which the composite device is applied is connected to a computer.

FIG. 2 illustrates a composite device system in which a copier to which the composite device is applied is connected to a computer. The copier 10 includes a scanner 20, controller 30 and printer 40. When a color image is read into by the scanner 20 on the basis of the control by the controller 30, image processing is performed for the read image data by the controller 30, so that print data is generated. The printer 40 carries out color printing on the basis of the print data. Alternatively, when the copier 10 inputs a print command from the computer 1, the printer 40 carries out color printing on the basis of print data attendant on the input print command.

In the embodiment, the connection between the computer 1 and the copier 10 is accomplished by a USB interface. In this case, one connector 50a of a USB cable 50 is connected to a USB port 1a at the computer 1 side whereas the other connector 50b is connected to a USB port 10a of the copier 10. The scanner 20 and the printer 40 of the copier 10 have previously determined channel IDs respectively. When delivering a command, the computer 1 adds the channel ID to the command, so that the scanner 20 and the printer 40 can be operated individually. Furthermore, the copier 10 is provided with an operation panel 35 including operation buttons 35a starting copying and the scanner 20 and a liquid-crystal display 35b displaying the status of the copier 10, so that copy commands and scanning commands can be delivered from the copier 10 itself.

Figure 3:
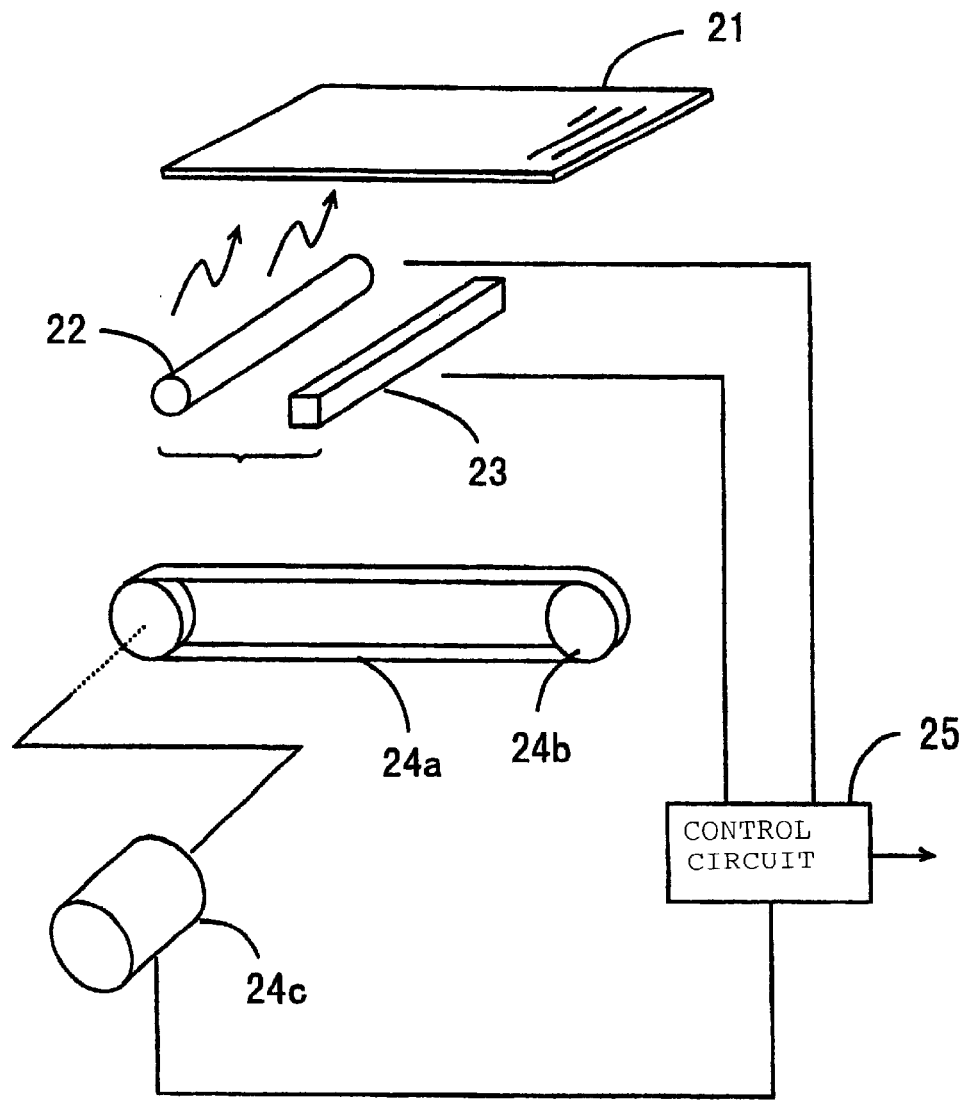
FIG. 3 is a schematic block diagram showing the arrangement of a scanner provided in the copier.

FIG. 3 shows a schematic arrangement of the scanner 20. A flatbed type scanner is employed as the scanner 20. The scanner 20 includes a transparent plate 21 on which an object to be scanned is placed. An illumination lamp 22 and a line sensor 23 are supported below the transparent plate 21 to be reciprocally slidable. A driving belt 24a, pulley 24b and drive motor 24c are also disposed below the transparent plate 21. The illumination lamp 22, line sensor 23 and drive motor 24c are connected to a control circuit 25. In a case where a color image is read, the object is illuminated through the transparent plate 21 by the illumination lamp 22 when the latter is turned on based on a control signal delivered from the control circuit 25. The line sensor 23 includes filters and CCD elements both corresponding to three primary colors of the light. One row of filters and one row of CCD elements per color and accordingly three rows filters and three rows of CCD elements are usually disposed. The three CCD elements reads a color arrangement of one row of the article, delivering it as image data. On the other hand, the control circuit 25 drives the drive motor 24*c*, so that the illumination lamp 22 and the line sensor 23 are moved together lengthwise with respect to the original. Image data is obtained to be delivered every time the illumination lamp 22 and the line sensor 23 are moved by a short distance. As a result, a main scanning is performed widthwise and a secondary scanning is performed lengthwise, whereby two dimensional image data is produced.

Figure 4:
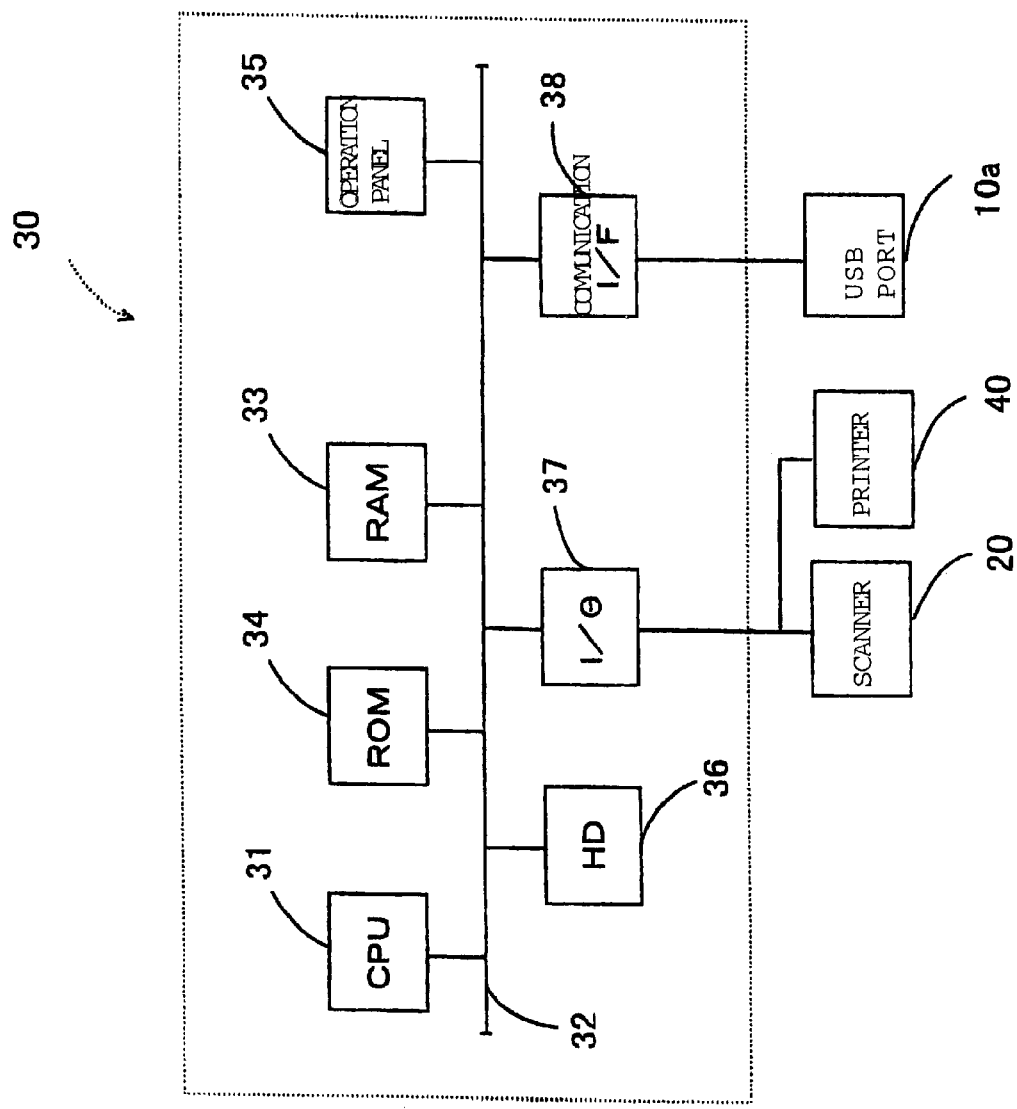
FIG. 4 is a schematic block diagram showing the arrangement of a controller provided in the copier.

FIG. 4 shows a schematic block diagram of the controller 30. The controller 30 is schematically equal with a computer. To a bus 32 of a CPU 31 are connected a RAM 33, ROM 34, operation panel 35, hard disc 36, I/O 37 and communication I/F 38. The scanner 20 and the printer 40 are connected via the I/O 37 to the bus 32. The communication I/F 38 is connected to the USB port 10*a*. The ROM 34 stores basic programs such as an operation program and control program. The CPU 31 carries out the basic programs while using the RAM 33 as a work area. The hard disc 36 is used mainly as a buffer storing read image data and print data. The hard disc 36 is further used to store a successively renewed program. The operation panel 35 includes various operation buttons 35*a* starting copying and the scanner 20 and a liquid-crystal display 35*b* displaying and confirming information about operation and the status of the printer 40. The CPU 31 monitors and displays via the bus 32 operation of the operation panel 35.

Figure 5:
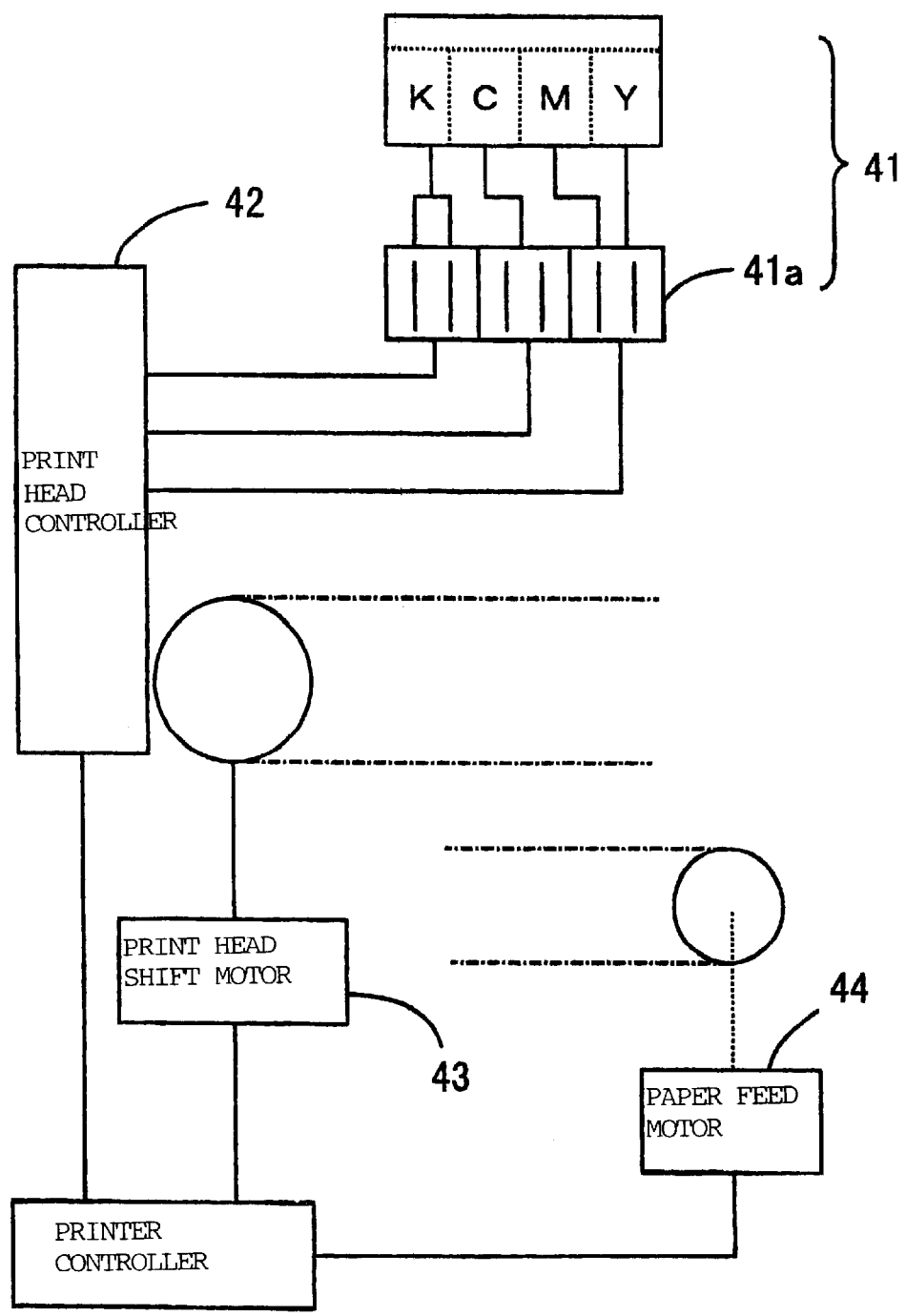
FIG. 5 is a schematic block diagram showing the arrangement of a printer provided in the copier.

FIG. 5 shows a schematic arrangement of the printer 40 of the ink jet type in which color inks are discharged in a dot matrix onto recording paper so that printing is performed. More specifically, the printer 40 includes a print head 41 provided with three print head units 41*a*, a print head controller 42 controlling the print head 41, a print head shift motor 43 for shifting the print head 41, a paper feed motor 44 for horizontally feeding printing paper, and a printer controller 45 for interfacing the print head controller 42, print head shift motor 43 and paper feed motor 44 to an external device.

The printer 40 uses four color inks, and each print head unit 41*a* has two rows of individual print nozzles. Inks to be supplied can be changed in the unit of row of print nozzle. In the embodiment, a black ink (K) is supplied to two rows of print nozzles of the left-hand print head unit 41*a*. Regarding the right-hand print head unit 41*a*, a magenta ink (M) is supplied to the left-hand row whereas a yellow ink (Y) is supplied to the right-hand row. Regarding the middle print head 41*a*, a cyan ink (C) is supplied to the left-hand row and the right-hand row is not used. Although four color inks are used in the embodiment, six color inks may be used by utilizing two rows of print head nozzles in each print head unit 41*a* to the fullest, instead. In this case, both dark-colored and light-colored inks are used regarding each of the cyan and magenta. The yellow and the black are further used such that six colors can be used in total. Although the printer 40 of the ink jet type is used in the embodiment, the printer used should not be limited to the ink jet type. A laser printer or dot impact printer may be used, instead.

Figure 6:
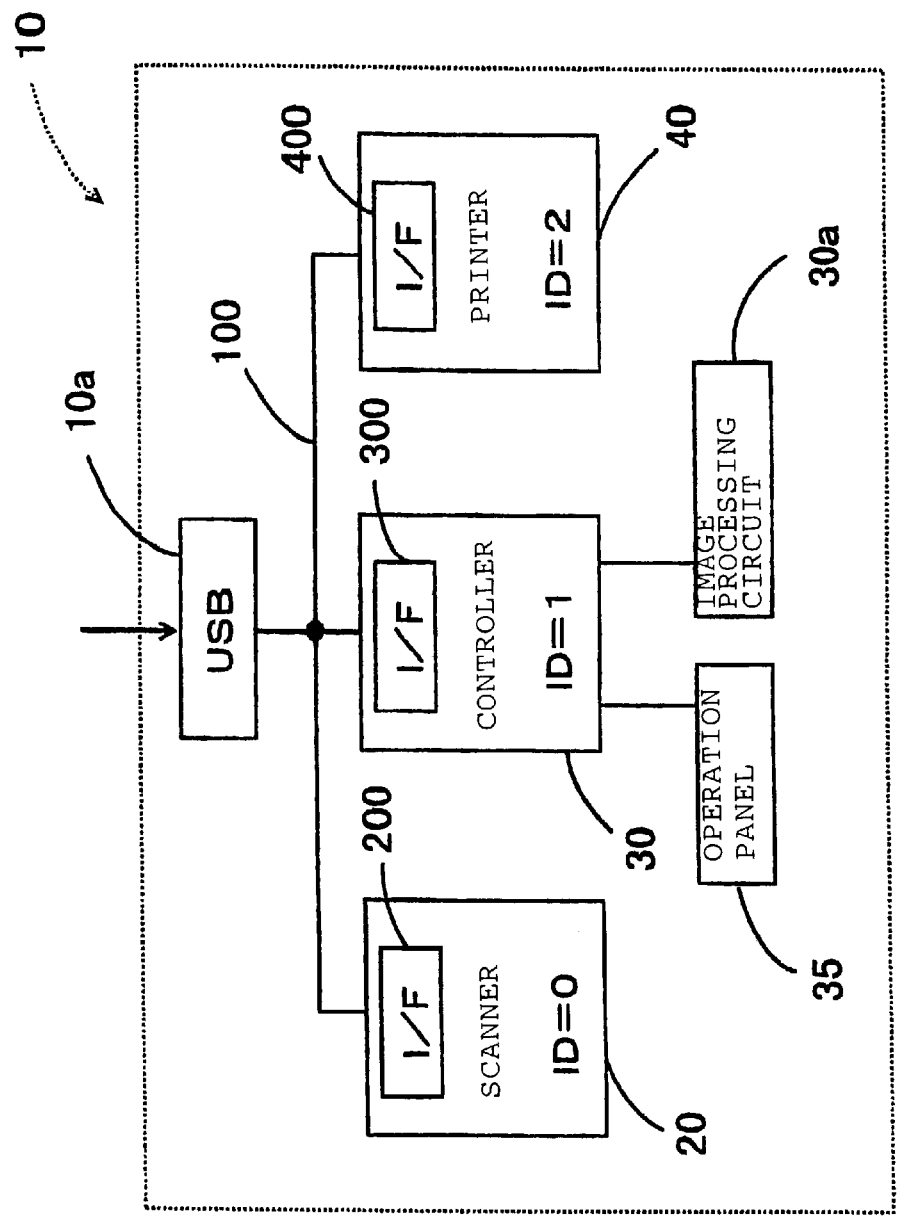
FIG. 6 is a block diagram showing the inner arrangement of the copier.
Figure 7:
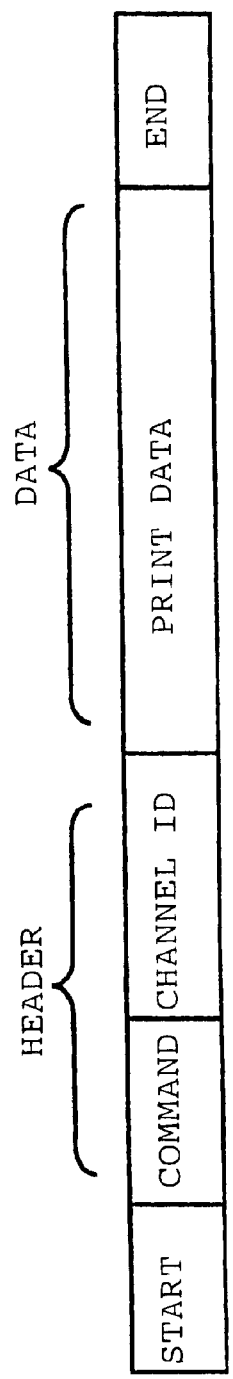
FIG. 7 illustrates data contents of commands the copier inputs.

FIG. 6 is a schematic block diagram showing an electrical arrangement of the copier 10. A command inputted at the USB port 10*a* contains a channel ID in a header thereof as shown in FIG. 7. A channel ID is previously assigned to each of the scanner 20, printer 40, etc. Accordingly, assume now that the scanner 20 is assigned with ID=0, the controller 30 with ID=1 and the printer 40 with ID=2. When a command inputted from the USB port 10*a* is assigned with ID=0, an interface 200 of the scanner 20 determines that the command is directed to itself, starting a predetermined scanning process. When a command inputted from the USB port 10*a* is assigned with ID=2, an interface 400 of the printer 40 determines that the command is directed to itself, starting a predetermined printing process on the basis of print data contained in a data part of the command. Furthermore, when assigned with ID=1, a command is directed to the controller 30. In this case, the command corresponds to a case where the computer 1 changes a parameter of the image processing circuit 30*a* or the status of the operation panel 35 is obtained, or is equal with the instructions in the case where one of the operation buttons of the operation panel 35 has been operated.

On the other hand, a copy command can be input to the controller 30 by use of the operation button 35*a* of the operation panel 35. When the copy command is input, the scanner 20 is operated so that image data of an original to be copied is obtained via a transfer bus 100 and interface 300. Print data is produced on the basis of the image data, and the printer 40 performs a printing operation on the basis of the print data. The print data is originated mainly by the image processing circuit 30*a*. More specifically, the controller 30 operates the scanner 20 when inputting the copy command as the result of depression of the operation button 35*a* of the operation panel 35 for starting copying. The image processing circuit 30*a* carries out a predetermined image processing for the image data of the original obtained by the scanner 20 to thereby originate print data. The aforesaid image processing includes a converting process for converting the image data obtained by the scanner 20 and composed of RGB data to CMYK data used in the printing. The image processing may include a halftone process and an image compensating process in addition to the converting process. Of course, the image processing may include other image correcting processes.

The operation of the controller 30 will now be described with reference to FIGS. 4 and 6. A command input from the USB port 10*a* is delivered via the communication I/F 38 to the bus 32. The command is further delivered via the I/O 37 to the scanner 20 and the printer 40. At this time, the CPU 31 inputs the command and carries out a predetermined command translating process. When the input command is for the controller 30 as the result of translation, the controller carries out a predetermined process. When the command is not for the controller 30, it is for the scanner 20 or the printer 40. Accordingly, the controller 30 determines whether a conflict will occur between operations. When determining that a conflict will occur, the controller 30 controls operations between commands delivered to the scanner 20 and the printer 40.

Figure 8:
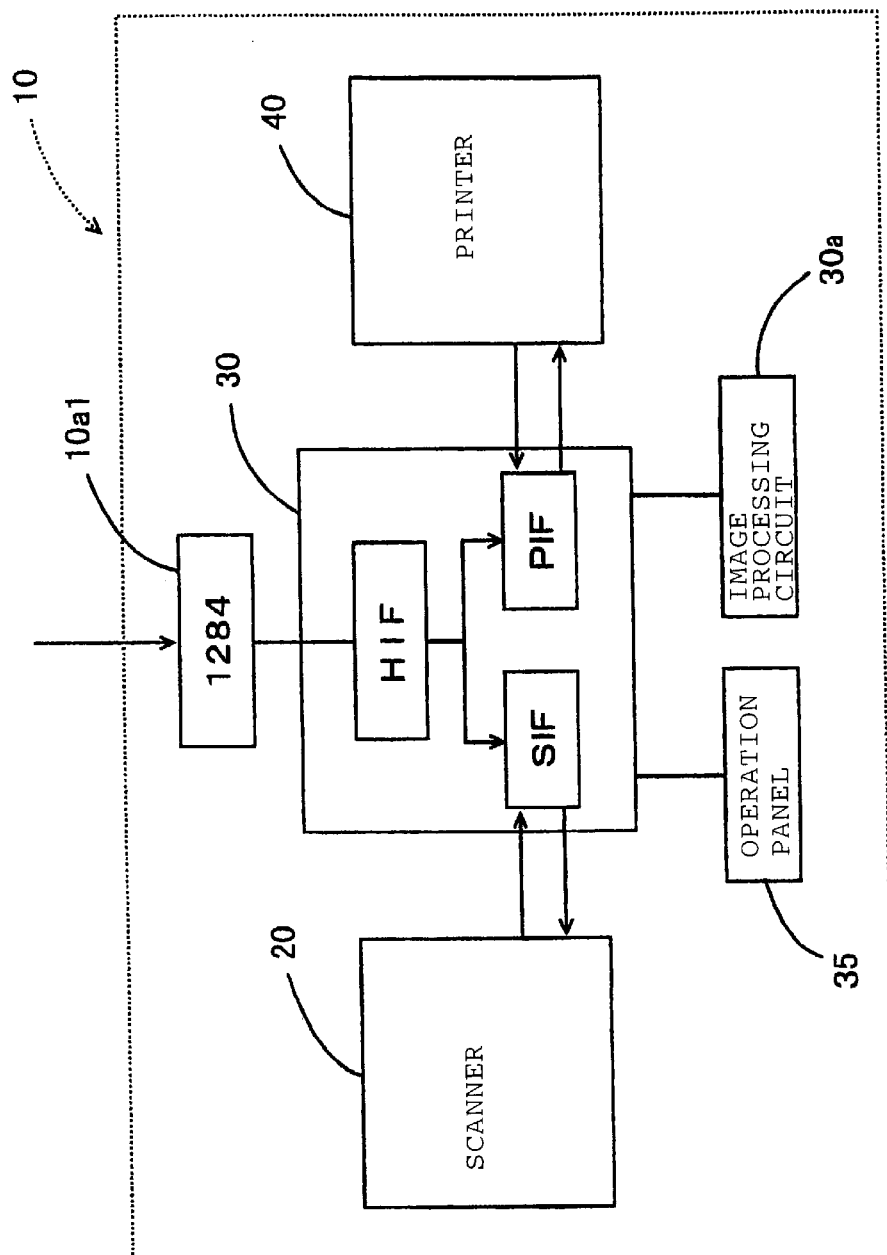
FIG. 8 is a block diagram showing a modified form of the inner arrangement of the copier.

The embodiment employs an arrangement of inputting a command containing a channel ID via the USB port 10*a* from the computer 1 to which the copier 10 is connected, as shown in FIG. 6. Of course, a connecting manner should not be limited to the above using the USB port 10*a*. A parallel interface 10*a*1 called IEEE1284 as shown in FIG. 8 may be applied or another interface may be applied. In this case, the controller 30 includes a host interface 30*a* obtaining a predetermined command and data input from the computer 1 connected to the parallel interface 10*a*1, a scanner interface 30b carrying out predetermined communication with the scanner 20 and a printer interface 30c carrying out predetermined communication with the printer 40. The host interface 30a controls the scanner 20 and the printer 40 while determining the command input via the parallel interface 10a1 for the scanner 20 or the printer 40.

Furthermore, the embodiment employs as the composite device the copier 10 provided with the scanner 20 and the printer 40. A device to which the composite device is applied should not be limited to the aforesaid copier. A facsimile machine may be provided with a scanner or a digital camera may be provided instead of the scanner 20. Accordingly, a method of connecting a predetermined device for every logical channel discriminated under a predetermined interface such as a single USB port 10a may be changed.

As obvious from the above, the USB port 10a constitutes the interface unit C1 in the invention since it is connected to the computer 1 and inputs a command containing the channel ID of the logical channel. Furthermore, the scanner 20 and the printer 40 constitute the devices C21 and C22 respectively since these are operated on the basis of a command. The controller 30 constitutes the control device C3 in the invention since it operates another device on the basis of the obtained command. The transfer bus 100 constitutes the data transfer path C4 in the invention. The aforesaid channel ID constitutes the logical channels C12, C13 and C14 in the invention. The operation panel 35 constitutes the interface unit C33 in the invention.

Figure 9:
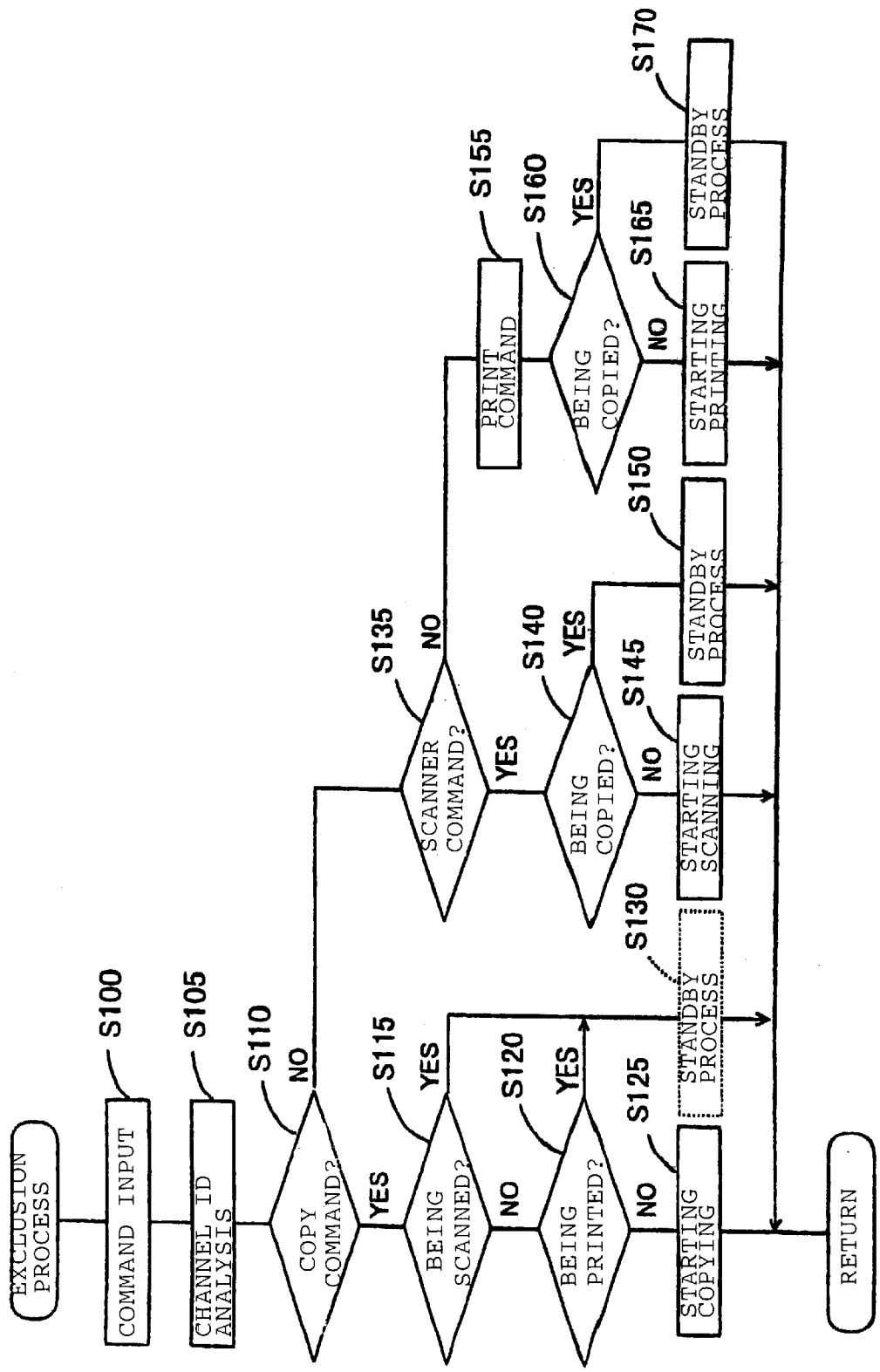
FIG. 9 is a flowchart showing processing contents of an exclusion process carried out by the controller of the copier.

An exclusion control process for a command is an example of a control of operation of a device carried out by the controller 30 constituting the control device C3. FIG. 9 is a flowchart showing processing contents of an exclusion process. The controller 30 inputs a command from the USB port 10a or the operation panel 35. In the embodiment, three commands, namely, a scanner command, a printer command and a copy command, are input from the USB port 10a or the operation panel 35 (step S100). When inputting a command, the controller 30 analyzes the command while obtaining the channel ID contained in a header of data contents as shown in FIG. 7 (step S105). The controller 30 then determines whether the channel ID is for the controller and whether the command is a copy command (step S110). When determining that the command is a copy command for the controller 30, the controller determines whether the scanner 20 is carrying out scanning (step S115) and whether the printer 40 is carrying out printing (step S120).

When neither scanning nor printing is carried out, the controller 30 starts a copying operation on the basis of a copy command input at step S110 (step S125). On the other hand, when the scanner 20 is carrying out scanning at step S115 or the printer 40 is carrying out printing at step S120 and a conflict occurs with the copy command, the controller 30 carries out the exclusion control, advancing to a standby process which will be described later or canceling the copy command (step S130).

When the channel ID is for the controller 30 at step S110 and the command is not a copy command, the controller determines whether the channel ID is a scanner command for the scanner 20 (step S135). When the channel ID is the scanner command, the controller 30 determines whether the printer 40 is carrying out a copying operation (step S140). When the copying operation is not being carried out, the controller 30 controls the scanner 20 so that scanning is carried out for the original, thereby obtaining image data. The controller 30 transfers the image data via the USB port 10a to the computer 1 (step S145). On the other hand, when the printer 40 is performing the copying operation and a conflict with the scanner command occurs, the controller 30 carries out the exclusion control, advancing to the standby process which will be described later or canceling the scanner command (step S150).

When determining at step S135 that the channel ID is not the scanner command, the controller 30 determines that the channel ID is the print command for the printer 40 (step S155). The printer 40 carries out printing on the basis of print data delivered from the computer 1 and discharges paper. Accordingly, the controller 30 determines whether the printer 40 is carrying out printing (step S160). When determining that the printer 40 is not carrying out printing, the controller 30 controls the printer 40 so that printing is carried out on the basis of the printer command (step S165). On the other hand, when the printer 40 is performing the copying operation and a conflict occurs, the controller 30 carries out the exclusion control, advancing to the standby process which will be described later or canceling the printer command (step S170).

Figure 10:
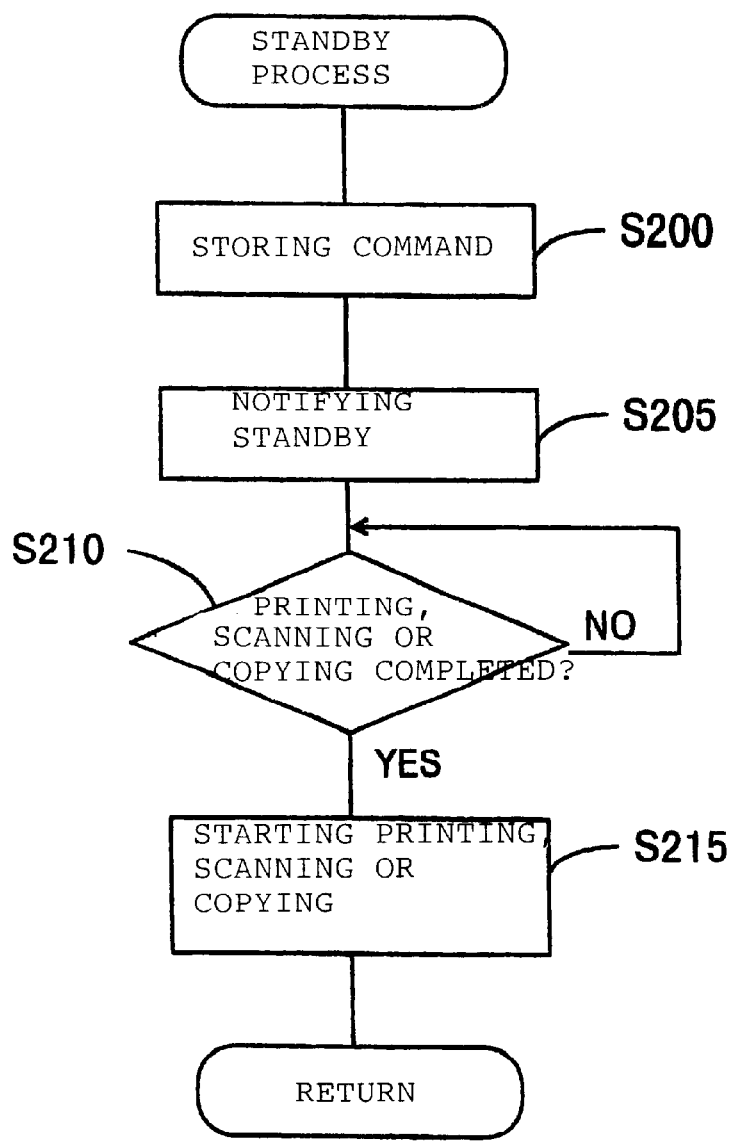
FIG. 10 is a flowchart showing processing contents of a standby process carried out by the controller of the copier.

Upon occurrence of a conflict, the processing for a predetermined command is deferred in the exclusion process. FIG. 10 shows the processing contents of the standby process carried out at steps S130, S150 and S170. Upon occurrence of a conflict between commands at step S115, S140 or S160, the controller 30 stores the command held on standby on the hard disc 36. In this case, when the command is a print command, print data is simultaneously stored (step S200). The controller 30 delivers a notification of standby to terminals from which the respective commands have been delivered. When notifying to the computer 1, the controller 30 delivers the notification via the USB port 10a. The computer 1 displays the notification of standby in a predetermined manner. Furthermore, when a copy command delivered from the copier 1 is held on standby, the controller 30 controls the liquid-crystal display 35b to display to that effect (step S205).

Figure 11:
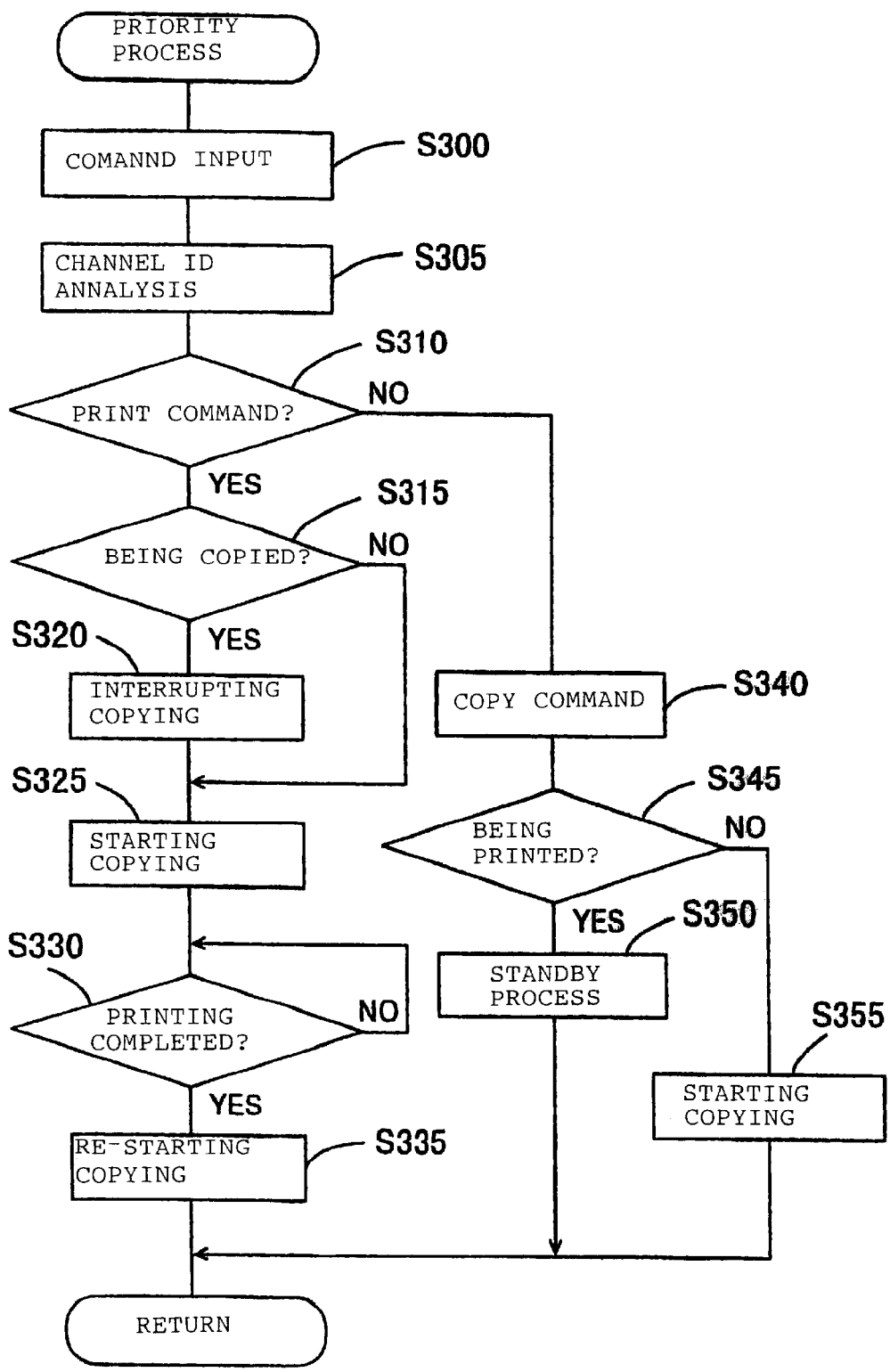
FIG. 11 is a flowchart showing processing contents of a priority process carried out by the controller of the copier.

The controller 30 is on standby until the printing operation carried out by the printer 40 at step S120, the scanning operation carried out by the scanner 20 at step S140 or the copying operation carried out by the scanner 20 and printer 40 at step S160 is completed. Upon completion of the aforesaid printing, scanning or copying operation, a printing, scanning or copying operation is started on the basis of the print, scanner or copy command held on standby (step S215). Accordingly, the processing at step S200 constitutes the command holding unit C31 in the invention. Furthermore, the processing at step S205 constitutes the operation standby notifying unit C32 and the status notifying unit C33 in the invention. A modified form of the exclusion control is a process for giving priority to a process based on a predetermined command upon occurrence of a conflict between the print command and the copy command in the printer 40. FIG. 11 shows the processing contents of the priority process.

In the embodiment, an order of priority between commands is previously set in the computer 1 or the operation panel 35. In this case, the order of priority is set between the print command and the copy command. The print command delivered from the computer 1 is set so as to have priority over the copy command. The controller 30 inputs a command from the USB port 10a or the operation panel 35 (step S300). When inputting a command, the controller 30 analyzes the command while obtaining the channel ID contained in a header of data contents as shown in FIG. 7 (step S305). The controller 30 then determines whether the channel ID is a print command for the printer 40 (step S310).

When determining that the channel ID is the print command for the printer 40, the controller 30 determines whether the printer 40 is carrying out printing (step S315).

When determining that the printer 40 is carrying out printing, the controller 30 interrupts the printing operation since the print command is set to have priority over the copy command (step S320). The printing operation is performed on the basis of the print command and print data (step S325). The copying operation is on standby until the printing operation is completed. The standby is carried out on the basis of a standby process as shown in FIG. 10 (step S330). Upon completion of the printing operation, the controller 30 re-starts the copying operation which has been interrupted at step S320 (step S335). On the other hand, when the command interpreted at step S310 is a copy command for the controller 30 (step S340), the controller determines whether the printer 40 is carrying out a printing process (step S345). When determining that the printer 40 is carrying out the printing process, the copying operation on the basis of the copy command is on standby since the print command is set to have priority over the copy command. The standby is carried out on the basis of the standby process as shown in FIG. 10 (step S350). Of course, when determining that the printer 40 is not carrying out the printing process, the controller 30 carries out the copying operation on the basis of the copy command (step S355). Accordingly, the setting of the priority order performed on the computer 1 or the operation panel 35 constitutes the priority order setting unit C34.

The USB port 10a which has a physically single connecting section and is connectable at one connector to a composite device is logically divided into a plurality of logical channels. The scanner 20, printer 40 and controller 30 controlling them, each of which serves as a device, are connected to the respective logical channels. Thus, the devices having a plurality of functions respectively can be provided in one composite device.

Furthermore, the controller 30 controls the scanner 20 and printer 40 on the basis of the commands input from the logical channels or the operation panel 35 provided on the device and the channel ID contained in the command. Accordingly, the user of the external device from which the command is delivered need not be conscious of the status of one of the scanner 20 and the printer 40 when either one of them is used. Consequently, the operation can be simplified. Furthermore, the order of priority is set between the commands including the one using the printer 40, so that the printing process which uses the printer 40 for a long time is interrupted so that a predetermined command is carried out. Consequently, printed matter produced by the printing process on the basis of the predetermined command can quickly be obtained.

INDUSTRIAL APPLICABILITY

The present invention provides a composite device which comprises at least two devices and in which at least one of the devices controls the other, so that the composite device can easily be operated since the user is conscious of only the device to be controlled without taking the other device into consideration, whereupon the operation can be simplified.

According to one embodiment of the invention, data transfer between the devices is controlled in the secured data transfer path. Consequently, data transfer between the devices can be accelerated and transfer of a large amount of data can be coped with.

According to another embodiment of the invention, transfer of a large amount of data between the data input device and the data output device can be accelerated. Consequently, the invention is suitable for a case where the data input device is applied to a device inputting image data and the data output device is applied to a device from which image data is output.

According to yet another embodiment of the invention, the device can be operated not only by a command delivered from an external device connected to the interface unit but also by the instruction input directly from the user.

According to a further embodiment of the invention, even in a case where a conflict of operation occurs in the device when the control device inputs from the interface unit a plurality of commands operating one and the same device, the command held as the result of conflict can be carried out upon completion of the operation of the previous command.

According to one embodiment of the invention, the user can confirm a case where the operation of the command delivered by himself or herself is held.

According to another embodiment of the invention, the command obtaining the status of the device can be used as well as the command causing the device to operate. Furthermore, the state of the device can readily be grasped at a device to which the command has been delivered.

According to a further embodiment of the invention, when the operation of the command having higher priority is to be carried out in one device during operation of the command having lower priority, the operation of the command having higher priority can be carried out first.

According to another embodiment of the invention, even when the operation of the command having lower priority is disturbed by the command having higher priority, the operation of the command having lower priority can be carried out upon completion of the operation of the command having higher priority.

According to yet another embodiment of the invention, a composite device system can be provided in which the control device can control the same peripheral device by the command delivered from the host connected or at least two devices connected to the respective logical channels on the basis of the command.

According to a further embodiment of the invention, the composite device has at least two devices one of which is constituted by a control device controlling the operation of the other device. Consequently, since the user is conscious of only the device to be controlled without taking the other device into consideration, the composite device controlling method can be provided in which the operability can be improved.

According to another embodiment of the invention, the composite device has at least two devices one of which is constituted by a control device controlling the operation of the other device. Consequently, since the user is conscious of only the device to be controlled without taking the other device into consideration, the medium on which a composite device control program for controlling at least two devices connected to at least two logical channels respectively is recorded can be provided in which the operability can be improved.

What is claimed is:

1. A composite device, comprising:
   an interface unit and a plurality of devices, including a printing device, an image scanning device, and a control device;
   the interface unit being divided into a plurality of physically identical logical channels, and obtaining predetermined commands;

each of the plurality of devices being interconnected to respective ones of the plurality of logical channels, and being operated on the basis of the predetermined commands;

the control device controlling the operation of the other devices of the plurality of devices to perform the commands obtained by the interface unit;

the control device comprising a command holding unit and a priority setting unit;

the commanding holding unit holding one of the commands obtained by the interface unit; and the priority setting unit setting a priority for a given command;

wherein, when a competition occurs, between one device of the plurality of devices attempting to perform one command and another device of the plurality of devices attempting to perform another command, the control device:

causes the one device to be operated according to the one command, causes the command holding unit to hold the other command, and upon completion of the operation by the one device, causes the other device to be operated on the basis of the other command held by the command holding unit;

wherein, when a given command for operating one device of the plurality of devices is inputted at a time when another device of the plurality of devices is being operated on the basis of another command, and the given command has a respective priority higher than the respective priority of the other command, the control device:

interrupts operation of the other device, and causes the operation of the one device until completion of the operation indicated by the given command.

2. The composite device according to claim 1, wherein the control device includes a user interface unit directly receiving instructions from a user as well as said interface unit.

3. The composite device according to claim 1, wherein the control device includes an operation standby notifying unit notifying operation standby to the device to which the command held by the command holding unit is delivered.

4. The composite device according to claim 1, wherein the control device includes a status notifying unit obtaining from the device a status, indicative of a working condition of the device, in response to the interface unit obtaining a command for obtaining the status.

5. The composite device according to claim 1, wherein the control device holds in the command holding unit the command regarding which the operation of the device is interrupted and operates the device on the basis of the command regarding which the operation of the device is interrupted, said command being held by the command holding unit, when the operation of the device on the basis of the command having the higher priority.

6. A composite device system, comprising:

a composite device, and a host;

the host having a command output unit delivering predetermined commands to the composite device over a connection;

the composite device having an interface unit and a plurality of devices, including a printing device, an image scanning device, and a control device;

the interface unit being divided into a plurality of physically identical logical channels, and obtaining predetermined commands;

each of the plurality of devices being interconnected to respective ones of the plurality of logical channels, and being operated on the basis of the predetermined commands;

the control device controlling the operation of the other devices of the plurality of devices to perform the commands obtained by the interface unit;

the control device comprising a command holding unit and a priority setting unit;

the commanding holding unit holding one of the commands obtained by the interface unit; and the priority setting unit setting a priority for a given command;

wherein, when a competition occurs, between one device of the plurality of devices attempting to perform one command and another device of the plurality of devices attempting to perform another command, the control device:

causes the one device to be operated according to the one command, causes the command holding unit to hold the other command, and upon completion of the operation by the one device, causes the other device to be operated on the basis of the other command held by the command holding unit;

wherein, when a given command for operating one device of the plurality of devices is inputted at a time when another device of the plurality of devices is being operated on the basis of another command, and the given command has a respective priority higher than the respective priority of the other command, the control device:

interrupts operation of the other device, and causes the operation of the one device until completion of the operation indicated by the given command.

7. A composite device control method intended for use with a composite device having an interface unit and a plurality of devices, including a printing device, an image scanning device, and a control device, with the interface unit being divided into a plurality of physically identical logical channels, and obtaining predetermined commands, each of the plurality of devices being interconnected to respective ones of the plurality of logical channels, and being operated on the basis of the predetermined commands, the method comprising:

controlling, with the control device, the operation of the other devices of the plurality of devices to perform the commands obtained by the interface unit;

holding one of the commands obtained by the interface unit; and setting a priority for a given command;

wherein, when a competition occurs, between one device of the plurality of devices attempting to perform one command and another device of the plurality of devices attempting to perform another command:

causing the one device to be operated according to the one command, causing the command holding unit to hold the other command, and upon completion of the operation by the one device, causing the other device to be operated on the basis of the other command held by the command holding unit; and wherein, when a given command for operating one device of the plurality of devices is inputted at a time when another device of the plurality of devices is being operated on the basis of another command, and the given command has a respective priority higher than the respective priority of the other command:
   interrupting operation of the other device, and
   causing the operation of the one device until completion of the operation indicated by the given command.

8. A computer program product having a computer readable medium with a composite device control program having instructions for enabling performance of a composite device control method, intended for use with a composite device having an interface unit and a plurality of devices, including a printing device, an image scanning device, and a control device, with the interface unit being divided into a plurality of physically identical logical channels, and obtaining predetermined commands, each of the plurality of devices being interconnected to respective ones of the plurality of logical channels, and being operated on the basis of the predetermined commands, the instructions defining steps comprising:

controlling, with the control device, the operation of the other devices of the plurality of devices to perform the commands obtained by the interface unit;

holding one of the commands obtained by the interface unit; and setting a priority for a given command;

wherein, when a competition occurs, between one device of the plurality of devices attempting to perform one command and another device of the plurality of devices attempting to perform another command:
      causing the one device to be operated according to the one command,
      causing the command holding unit to hold the other command, and
      upon completion of the operation by the one device, causing the other device to be operated on the basis of the other command held by the command holding unit; and wherein, when a given command for operating one device of the plurality of devices is inputted at a time when another device of the plurality of devices is being operated on the basis of another command, and the given command has a respective priority higher than the respective priority of the other command:
      interrupting operation of the other device, and
      causing the operation of the one device until completion of the operation indicated by the given command.

* * * * *